United States Patent [19]

Bentley et al.

[11] 3,831,950

[45] Aug. 27, 1974

[54] GASKET FOR CLOSURE SEAL

[75] Inventors: Richard Lee Bentley; John Wesley Stubert, both of Memphis, Tenn.

[73] Assignee: Chicago Bridge & Iron Company, Oak Brook, Ill.

[22] Filed: Nov. 10, 1971

[21] Appl. No.: 197,232

[52] U.S. Cl............... 277/75, 277/211, 277/209, 49/475
[51] Int. Cl............................................. F16j 15/00
[58] Field of Search .............. 277/75, 209, 211, 29; 49/477, 495, 489, 475

[56] References Cited
UNITED STATES PATENTS

| | | | |
|---|---|---|---|
| 2,032,492 | 3/1936 | Nathan | 277/209 |
| 2,330,220 | 9/1943 | Kemper | 49/477 X |
| 2,684,262 | 7/1954 | Neesen | 277/75 X |
| 2,841,429 | 7/1958 | McCuistion | 277/209 |
| 2,853,330 | 9/1958 | Harry | 277/209 X |
| 3,260,530 | 7/1966 | Jelatis et al. | 277/2 |
| 3,647,229 | 3/1972 | Grimes | 277/207 |

*Primary Examiner*—Samuel B. Rothberg
*Attorney, Agent, or Firm*—Merriam, Marshall, Shapiro & Klose

[57] ABSTRACT

A sealing gasket in the form of a strip of resilient material having sealing faces on two opposing sides, a pair of longitudinal spaced apart protuberances on each sealing face defining a longitudinal trough therebetween and each protuberance having a pair of ridges defining a groove therebetween, said groove being shallower than the trough on the same sealing face.

2 Claims, 4 Drawing Figures

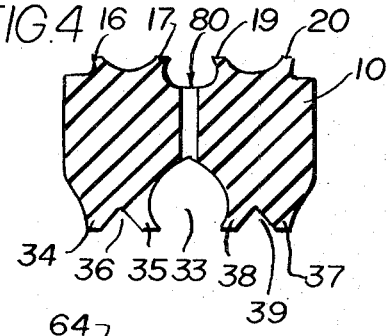
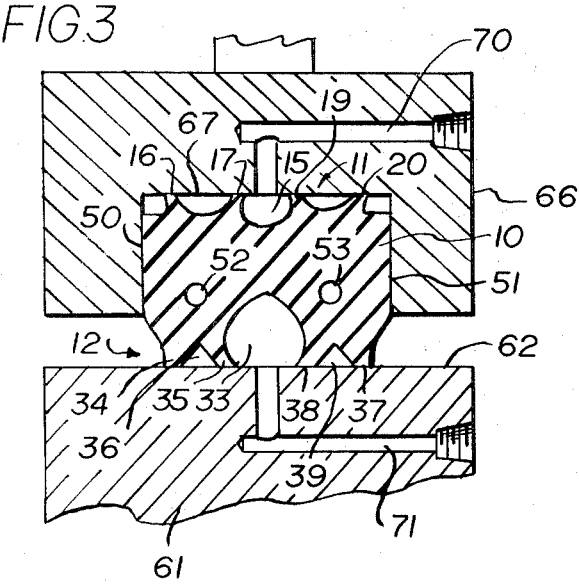
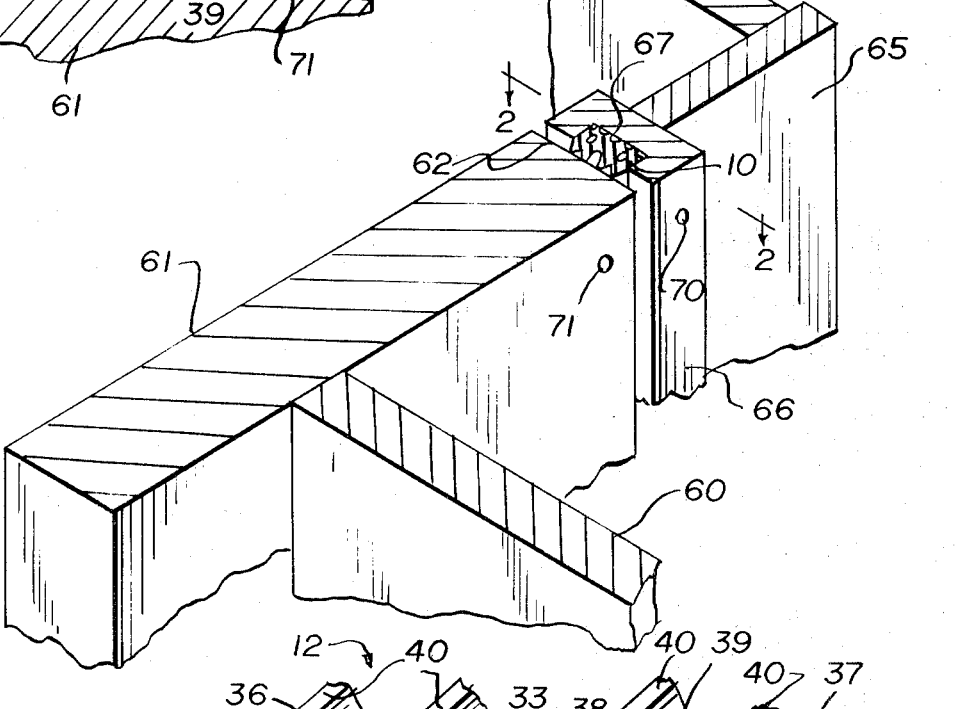
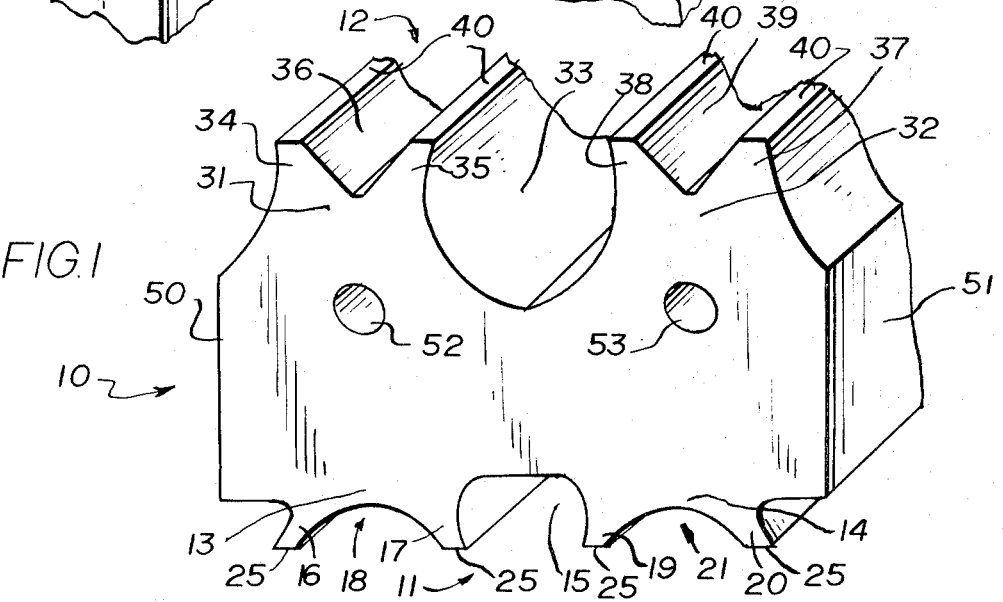

GASKET FOR CLOSURE SEAL

This invention relates to closures and sealing means therefor such as used in tanks, containment vessels, ships and building structures. More particularly, this invention is concerned with closures and sealing means therefor characterized by a high degree of sealing capability and inherent safety.

It is often necessary to provide access openings in tanks, reactor vessels, bulkheads of ships and walls of various types of other structures, including buildings. Such openings are often needed to properly service such structures and permit repair and maintenance as required. The use to which such structures are put often requires that such access openings be tightly closed or sealed off during use of the structures. Various types of doors or covers are used for this purpose. Where a tight seal is required, it is conventional to position a gasket between opposing surfaces on the structure and the door or cover plate and to achieve a pressure seal by means of bolts or other means.

To create seals of high reliability, particularly where high pressures or high vacuums are involved or where it is necessary to prevent escape of highly dangerous materials such as radioactive gases, it is common to employ at least two gaskets positioned in spaced apart relationship from one another. In addition, it is sometimes found advisable, even when two gaskets are used, to pressurize the space between the gaskets or to create a vacuum in such space. In this way, any material which would tend to leak from inside of a tank or vessel can be forced back in, such as when the space between the gaskets is pressurized, or when a vacuum is created between the gaskets, it can be removed and handled further.

Although two spaced apart gaskets can be employed as described, it is sometimes difficult to properly position two separate gaskets and, as a result, it is not uncommon for one gasket to bear a greater pressure than the other and for an inadequate seal to result. Furthermore, the proper installation of two gaskets takes longer because more seating channels are needed. Also, they are more readily damaged and subjected to wear than is a single gasket. Higher pressure is needed to seat double gaskets than a single gasket. The higher pressures often cause the gaskets to become distorted and this makes sealing more difficult. There is accordingly a need for a single sealing gasket which can be employed for tightly sealing by means of a closure an opening in tanks, vessels, ships and other structures but which still permits the application of a vacuum or increased pressure in the area of the sealing surfaces, or joint, between the eges of the gasket.

There is provided according to the subject invention a novel sealing gasket comprising an elongated strip of resilient material having sealing faces on two opposing sides of the strip. A pair of longitudinal spaced apart protuberances, advisably parallel to each other, are present on each of the sealing faces and the pair of protuberances on each sealing surface defines a longitudinal trough therebetween. Each of the protuberances has a pair of ridges which define a groove therebetween. In the preferred structure, the ridges on each protuberance are parallel to one another. The grooves are advisably shallower than the trough on the same sealing face. Furthermore, the elongated strip is advisably wider than the distance between the outermost ridges of the protuberances. The strip also is generally provided with a pair of opposing parallel elongated flat side wall portions which are adapted to fit into and against vertical flat side walls of a channel in a closure means. Also, while the troughs can be of substantially equal depth and width, it is advisable to have one of the troughs at least 50 percent deeper than the other trough. The deeper trough furthermore is advisably wider than the shallower trough. The sealing face of the gasket having the deeper trough is, in addition, generally positioned to face away from the bottom of a channel located in a closure means such as a peripheral face around an opening or in a door or cover. The deeper trough face is advisably positioned outwardly from the channel so that it is forced into contact with a sealing surface around an opening. The gasket can be mounted in a channel in a flange around an opening or in a channel in a closure such as a door. In either structure, the gasket is advisably positioned so that the shallower trough faces the channel bottom.

The invention also provides an improvement in closure construction in which the described gasket is employed in conjunction with sealing surfaces on first and second members having opposing matching surfaces. A channel in the surface of one of said members receives and securely holds the gasket in place. The closure construction also advisably includes at least one conduit which communicates with at least one of the troughs in the sealing gasket so that the space defined by one or both of the troughs can be pressurized or a vacuum created therein. Furthermore, in its preferred embodiment, the closure construction has at least one conduit communicating with each of the troughs of the gasket so that a vacuum or increased pressure can be created in the space of each of such troughs. Such conduits furthermore are advisably located to pass separately through a part of the first and second members.

The invention will be described further in conjunction with the attached drawings, in which:

FIG. 1 is an isometric view showing a sealing gasket provided by this invention;

FIG. 2 is an isometric view, partially in section, showing a closure employing the sealing gasket of FIG. 1;

FIG. 3 is an enlarged sectional view taken along the line 2—2 of FIG. 2; and

FIG. 4 is a sectional view of another embodiment of a sealing gasket provided by the invention.

So far as is practical, the same elements or parts which appear in the different views of the drawings will be identified by the same numbers.

With reference to FIG. 1 which is drawn essentially to scale three times larger than actual size, the sealing gasket 10 comprises an elongated strip of resilient material having a sealing face 11 and a sealing face 12 on opposing sides of the strip. The sealing gasket can be made of any suitable material but advisably is made of a stable resilient rubber or plastic substance. It is presently preferred to make the sealing gasket from silicone rubber.

Sealing face 11 has a pair of protuberances 13 and 14 extending out from the body of the strip and spaced apart from one another, thereby defining longitudinal trough 15 therebetween. Protuberance 13 has a pair of spaced apart parallel ridges 16 and 17 which extend out therefrom and define a groove 18 therebetween. Similarly, protuberance 14 has a pair of ridges 19 and 20 extending out therefrom which define groove 21 therebetween. Ridges 16 and 20 are identical to one another, and ridges 17 and 19 are identical, in the preferred embodiment. The surfaces 25 at the end of ridges 16, 17, 19 and 20 are flat and in the same plane. Furthermore, grooves 18 and 21 are also advisably made of the same size and shape.

Extending outwardly on the side of sealing face 12 is a pair of spaced apart protuberances 31 and 32 which define a longitudinal trough 33 therebetween. Protuberance 31 has a pair of spaced apart ridges 34 and 35 extending outwardly therefrom which define groove 36 therebetween. Similarly, protuberance 32 has a pair of spaced apart ridges 37 and 38 extending outwardly therefrom which define groove 39 therebetween. Grooves 36 and 39 are considerably shallower than trough 33. In addition, ridges 34 and 37 are substantially identical in construction and ridges 35 and 38 are also substantially identical in construction. The outer surfaces 40 of ridges 34, 35, 37 and 38 are smooth or flat and advisably lie in the same plane.

The sealing gasket also has opposing side walls 50 and 51 which are advisably planar and parallel to one another. Ridges 34 and 37 are generally positioned inwardly from the adjacent walls 50 and 51 as are the ridges 16 and 20 on the other sealing face.

Trough 33 is advisably at least 50 percent deeper than trough 15 and, in the specific embodiment shown in FIG. 1, trough 33 is essentially twice as deep as trough 15 and also somewhat wider. Holes 52 and 55, although not always required, are provided in the sealing gasket strip body to facilitate compression of the gasket when it is in use.

FIGS. 2 and 3 illustrate the position and use of the sealing gasket of FIG. 1 in a closure construction. Wall 60 of a tank, pressure vessel or other chamber is provided with a threshold member 61 which has an end surface 62 against which a seal is to be created. Door or cover 63 has a front plate 64, a peripheral flange 65 and a sealing member 66 having channel 67 therein. Gasket 10 is positioned snugly in channel 67 with the gasket side walls 50 and 51 in frictional contact with the side walls of the channel. In addition, gasket sealing face 11 is positioned in channel 67 such that the surfaces 25 of the gasket are in contact with the bottom of the channel. When the closure is open, the gasket remains seated firmly in channel 67. The gasket is advisably positioned in such a channel so that the sealing surface 12 having the deepest trough 33 is positioned outwardly to be forced into contact with sealing surface 62.

Although the gasket 10 can be used for sealing a closure without employing means to create a vacuum or increased pressure in any of troughs 15 or 33, it is generally advisable that means be provided for creating a vacuum or increased pressure in one or both of such troughs. Therefore, with reference to FIG. 3, a conduit 70 is provided which extends through member 66 into communication with trough 15 to thereby pressurize the trough space or create a vacuum therein. Similarly, a conduit 71 is advisably positioned in threshold 61 so that it communicates with trough 33 to create a vacuum or increased pressure therein.

The sealing gasket of FIG. 4 is like the gasket of FIGS. 1 to 3 except that the gasket of FIG. 4 lacks holes 52 and 53 but is provided with one or more holes 80 which communicate with troughs 15 and 33. By use of such a gasket, only one of conduits 70 and 71 is needed to simultaneously create a vacuum or increased pressure in both of troughs 15 and 33. The vacuum or increased pressure thereby created will be the same in both troughs rather than a differential vacuum or pressure which can be formed by use of two conduits 70 and 71.

It should be understood that bolts or other means to tightly force the closure or cover 64 against the sealing surface 62 is provided even though it is not illustrated by the drawings.

The sealing means provided by this invention can be employed with both troughs 33 and 15 pressurized so that if any gases attempt to escape from inside of the tank or vessel, they are forced back by flow of gas from the troughs. In this way, no gases can likely escape past the gasket and be vented out of the tank, vessel or the like. This is particularly important where it is intended to prevent escape of gases which may be radioactive.

The structure of the gasket provided by this invention also permits its use where it is advisable to periodically test and prove the closure is sealed. Thus, a vacuum or increased pressure can be created periodically in either or both of troughs 15 and 33 and if there is no change in the pressure created therein over a reasonable period of time it can be concluded that the seal is leakproof.

The shape and location of the adjoining pairs of ridges 34–35, 37–38, 16–17 and 19–20 facilitates formation of a tight seal. Either one or the other ridge in each pair of ridges is forced against an adjacent sealing surface by a pressure or vacuum which may occur on either side of the opening i.e. inside or outside of a vessel, or in the troughs 15 and 33 between the ridges.

The foregoing detailed description has been given for clearness of understanding only, and no unnecessary limitations should be understood therefrom as modifications will be obvious to those skilled in the art.

What is claimed is:

1. In a closure construction, a sealing means between a first member and a second member having opposed matching surfaces, comprising:
   a channel provided in said surface of said first member;
   an integral resilient sealing gasket mounted in said channel of said first member;
   said sealing gasket comprising an elongated strip of resilient material having sealing faces on two opposing sides of the strip with one of said sealing faces in contact with the channel bottom;
   a pair of longitudinal spaced apart protuberances on each of the sealing faces defining a longitudinal trough therebetween;
   fluid conduit means communicating with a trough of said sealing gasket for fluid flow between the trough and the outside of the adjacent first or second member; and
   each of said protuberances having a pair of ridges defining a groove therebetween, said groove being shallower than the trough on the same sealing face.

2. A closure construction sealing means according to claim 1 in which a fluid conduit communicated from each of said troughs to the outside of the adjacent first or second member.

* * * * *

PO-1050
(5/69)

UNITED STATES PATENT OFFICE
CERTIFICATE OF CORRECTION

Patent No. 3,831,950    Dated August 27, 1974

Inventor(s)   Richard Lee Bentley and John Wesley Stubert

It is certified that error appears in the above-identified patent and that said Letters Patent are hereby corrected as shown below:

Column 1, line 53, change "eges" to --edges--;
column 3, line 29, change "55" to --53--.

Signed and sealed this 29th day of October 1974.

(SEAL)
Attest:

McCOY M. GIBSON JR.
Attesting Officer

C. MARSHALL DANN
Commissioner of Patents